Jan. 19, 1932.  T. M. MEARS  1,841,494
PROCESS FOR MAKING DIE STAMPED PIES
Filed March 17, 1931  2 Sheets-Sheet 1
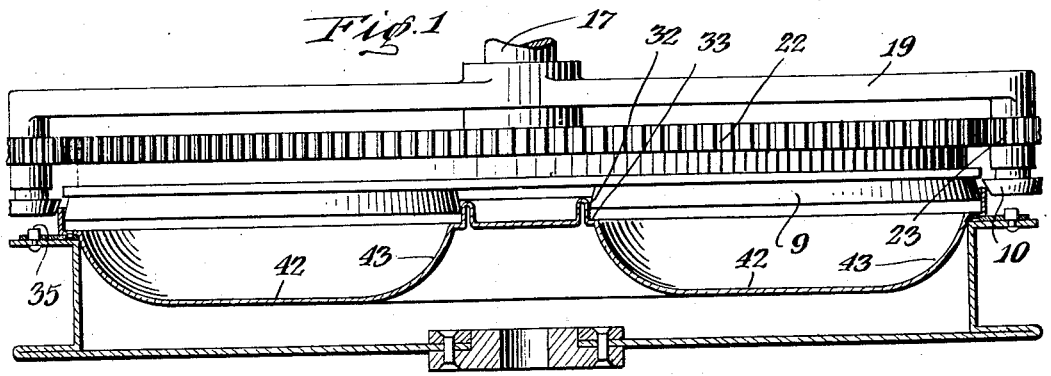
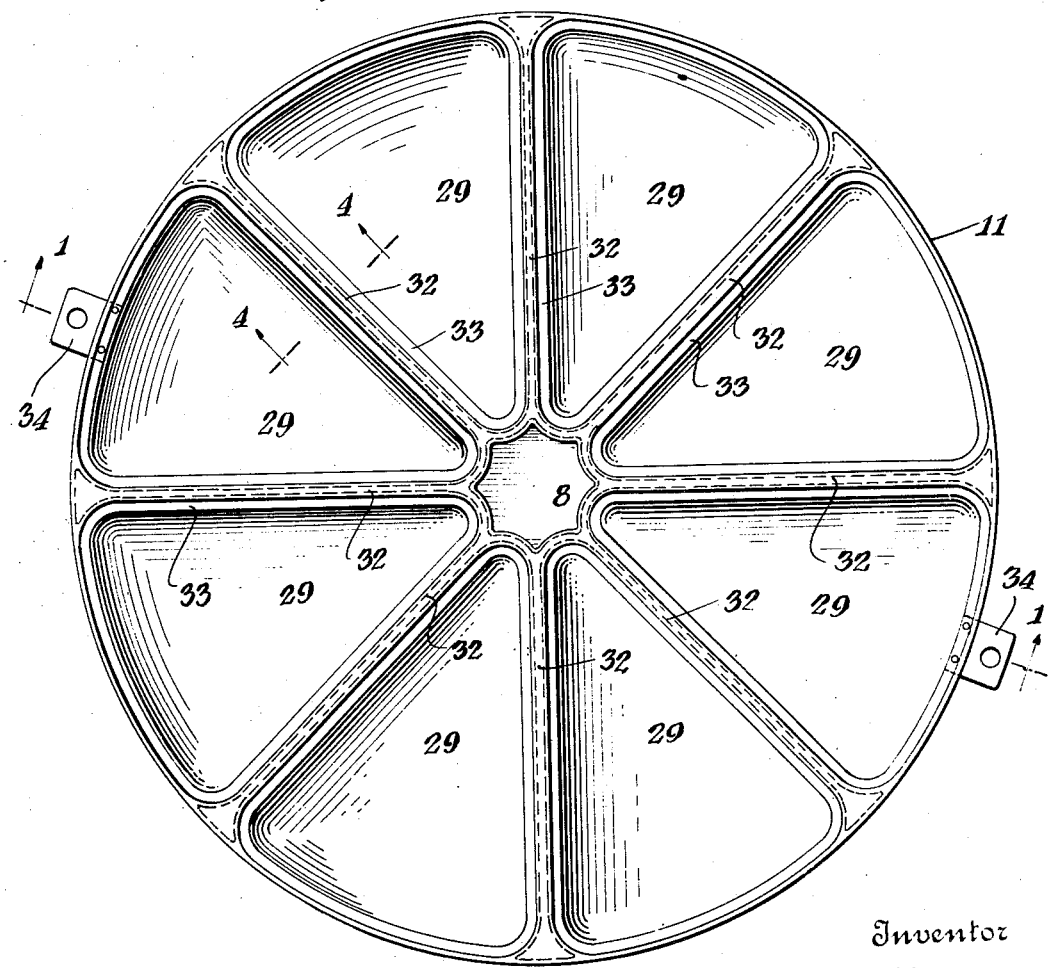
Inventor
Theodore M. Mears
By his Attorney
Charles A. Morton Jan. 19, 1932.  T. M. MEARS  1,841,494
PROCESS FOR MAKING DIE STAMPED PIES
Filed March 17, 1931  2 Sheets-Sheet 2
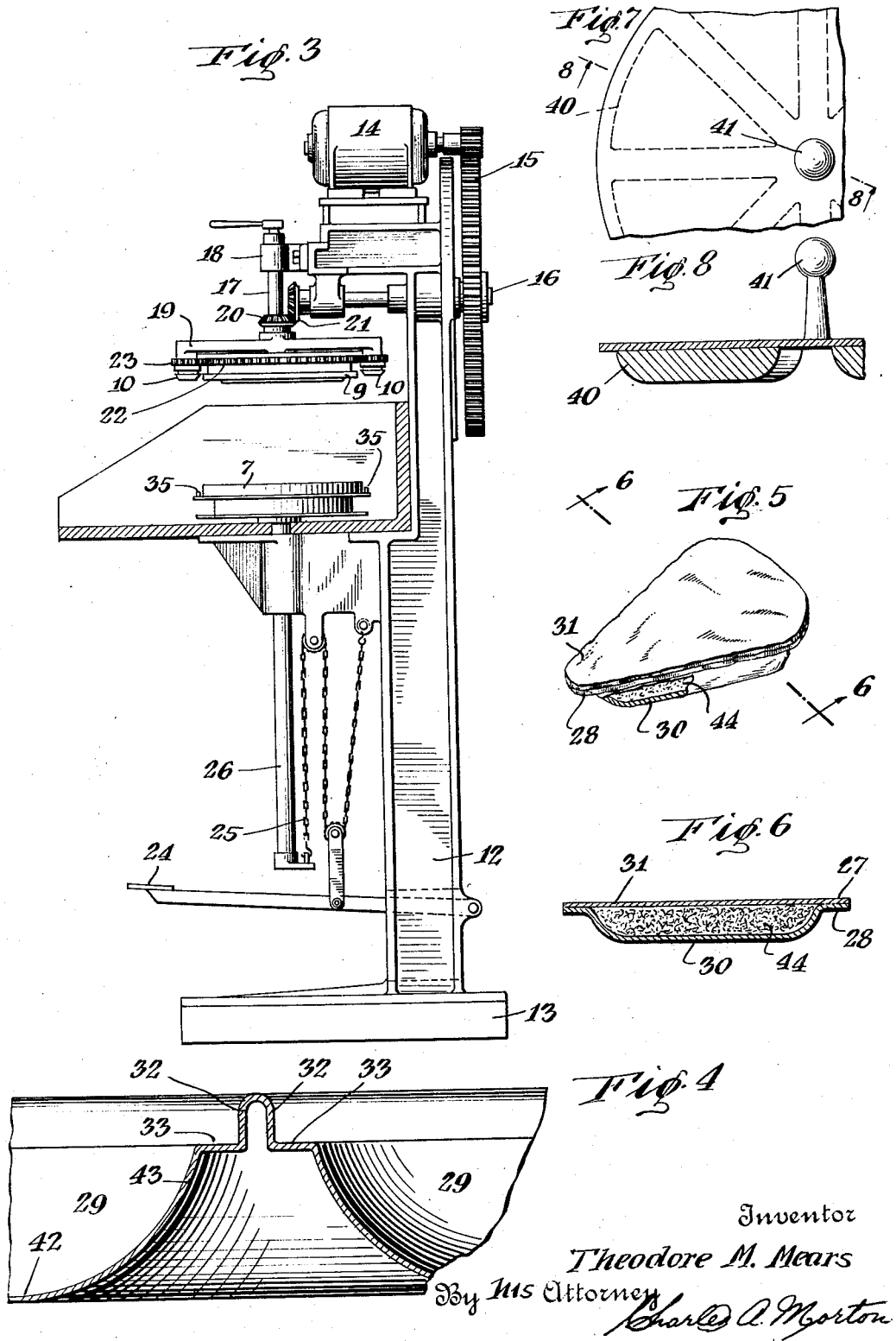
Inventor
Theodore M. Mears
By his Attorney
Charles A. Morton Patented Jan. 19, 1932

1,841,494

UNITED STATES PATENT OFFICE

THEODORE M. MEARS, OF BROOKLYN, NEW YORK, ASSIGNOR TO THE TRI-PIE CORPORATION, OF BROOKLYN, NEW YORK, A CORPORATION OF DELAWARE

PROCESS FOR MAKING DIE STAMPED PIES

Application filed March 17, 1931. Serial No. 523,254.

This invention relates to an improved process for making sector or triangular shaped pies.

It has heretofore been standard practice to bake pies in circular pie plates, the product being a circular pie approximately ten inches in diameter, which is thereafter cut into a plurality of pie sectors varying from six to eight in number constituting a portion of pie of a size sufficient to satisfy the appetite of the average diner. After some of the portions of pie have been removed from the pie plate the exposed cut edges of the remaining portions tend to cause the pie to become dry and stale besides exposing the sweetmeat contained therein to flies and other insects, so that by the time the final portion is ready to be sold it is frequently so altered in appearance that the customer would not accept it and it becomes necessary to treat it as waste matter. It will be obvious that the portions thus wasted reduce the profits upon the remainder pro rata. Again an individual pie portion made according to the standard practice heretofore described must be handled with care as it will break quite readily, such individual pie portions therefore are not very satisfactory when used in basket lunches and the like. In view of all these difficulties it seems surprising that individual pies having the appearance and dimensions of the standard sector of pie have not been adopted for general use but the cost of production of such pies if made by hand as opposed to the cost of hand cut sectors of large machine made round pies makes the proposition an expensive and therefore an uneconomic one.

One object of this invention is an individual pie conforming in size, shape, and general appearance to the individual pie portion of the former standard practice, which can be sold in competition therewith.

Another object is to keep the individual pie portion fresh and edible for a much longer period of time.

Another object is to improve the hygienic standard of the individual pie portion.

Another object is to reduce the risk of breakage in handling thus increasing the commercial possibilities thereof.

Another object is an inexpensive process for making such individual pies in order to permit competition with the individual pie portions used in standard practice in the prior art.

In accordance with this invention individual pies conforming in size, shape and general appearance to the pie portions of the former standard practice are made by a die stamping process, the product being a pie having the sweetmeat therein completely housed within a sector or triangular shaped shell of dough, the pie being thereafter baked in the usual manner.

In the drawings comprising two sheets of eight figures numbered Figures 1 to 8 inclusive;

Figure 1 is a side view of the die mechanism (partly in section and showing some of the parts partially broken away) employed to carry out one step of the process, the pie pan element of the die being a central section along the line 1—1 of Figure 2;

Figure 2 is a plan view of the segmental pie pan constituting one member of the die of Figure 1;

Figure 3 is a side view of one form of machine which may be employed to carry out the die stamping process;

Figure 4 is a vertical cross section of the pie pan die member taken along the line 4—4 of Figure 2 looking in the direction of the arrows;

Figure 5 is a perspective of a partly formed individual pie produced in accordance with the process hereinafter described, and showing the side wall partially broken away; and Figure 6 is a vertical cross section of the pie taken along the line 6—6 of Figure 5 looking in the direction of the arrows.

Figure 7 is a plan view of a matrix employed in carrying out the process, said matrix being broken away.

Figure 8 is a sectional view of the same, taken along the line 8—8 of Figure 7 looking in the direction of the arrows.

Like reference numerals designate corresponding parts throughout the several figures of the drawings.

In carrying out the process of making individual die stamped pies a sheet of rolled dough 30 (Figure 6) is first placed upon the pan 8 which is then gently tapped upon the bench or table causing the dough to work its way into the sector shaped receptacles 29 and form a lining upon the walls thereof conforming in contour to that of the walls of the pan 8. Instead of tapping the pan 8 upon the bench the matrix 40 may be pressed in the receptacles 29. The matrix 40 is so proportioned that it will snugly fit the receptacles 29 when a layer of dough is pressed between the face of the matrix and the bottom and side walls 42 and 43 respectively of the receptacles 29, hence when the sheet of rolled dough 30 is forced against the walls 42 and 43 of the receptacle 29, the bottom layer of dough is slightly stretched to form a lining upon the walls of the receptacle. The lower layer of dough 30 (Figure 6) indicates in cross section the shape assumed by the lower layer of dough in each receptacle 29. The matrix 40 may be individual to the receptacle 29, but as illustrated it is made in the form of a multiple unit.

After the matrix 40 has been employed the lining of dough 30 not only completely covers the surface of the pan 8 and the walls of the receptacles 29, but extends over the annular wall 11 to provide a trimming edge for removal by the cutter 10 (Figure 1) as hereinafter described. Each receptacle is now filled with any preferred sweetmeat 44 and if desired different receptacles 29 of the same pie may be filled with different sweetmeats dependent upon the needs of the particular restaurant or customer for which the pies are being made. The receptacles being filled with sweetmeat the top sheet of dough 31 (Figures 5 and 6) is next placed over the sweetmeat to completely cover the receptacles 29 and to leave a margin of dough projecting over the annular wall 11 to provide a trimming edge for the cutter 10 (Figure 1). The periphery of the adjacent surfaces of the dough may be moistened with water or the like in accordance with the well known practice to facilitate the ultimate merging of the separate flanges 27 and 28 into a single crust. It will be observed that up to this point the steps employed have conformed (except for the use of the matrix 40) substantially to those followed in making one large pie, and the time required to carry out this series of steps would not differ to any appreciable extent.

It should be observed however that the pie so far produced is merely one large pie having a plurality of separate cells 29 filled with sweetmeat. It is therefore necessary to finish off the complete pie and to divide it into a plurality of individual pies each a unit in itself, and to impart to each of said individual units the ultimate appearance, size and shape preparatory to baking the same. This brings us to the die stamping and waste trimming stage of the process which can be better understood by considering the apparatus disclosed in Figures 1 and 3.

Referring to Figure 3, the machine consists essentially of a bowl 7 in which the pie formed as hereinbefore described and housed in the pan-die member 8 (Figure 2) may be placed, before being brought into registry with the upper (complementary) element of the die 9 for causing the top and bottom layers of dough to be crimped together and united in the operation of imparting the ultimate shape to the unbaked pie. At the same time the rotary cutter 10 cuts and trims the waste dough extending beyond the annular flange 11 of the pan die 8.

In order to accomplish these results the mechanism is assembled upon a frame 12 secured to the pedestal 13. A motor 14 carried by said frame is gear coupled to a gear wheel 15 with its associated shaft 16 which is journalled in this frame 12. The die 9 is secured to a shaft 17 which is supported by an extension arm 18 of the frame 12.

The arm 19 carrying the cutters 10—10 is rotatably mounted upon the shaft 17. Bevelled gears 20 and 21, the latter connected to shaft 16 of gear 15 will impart rotary movement to the arm 19 when the motor 14 is in use, and the circular rack 22 serves to guide the gears 23—23 and consequently arm 19 and cutters 10—10.

The operation is as follows:—A freshly made unbaked pie in its associated pan die 8 is placed in the bowl 7 and the foot operated lever 24 is depressed to cause the chain 25 to force plunger 26 supporting bowl 7 vertically upwards whereby the pie is compressed between the walls of the upper and lower dies and the cutters 10 press the raw dough against the edge of flange 11 of the pan die 8 cutting off the waste dough. At the same time the upper and lower layers of dough are compressed between the circumferential and radial partitioning walls of the dies to unite said flanges 27 and 28 (Figure 6) along their oppositely disposed contacting margins. The said upward movement of the pan die 8 carried by bowl 7 and plunger 26 also causes the lower edges of the peripheral walls of the upper die 9 to sever the upper layer of dough along the lines of the radial partition walls 32 of the pan die 8 and the further upward movement of plunger 26 causes the peripheral walls of the upper die to compress the peripheral flanges 27 and 28 of the upper and lower layers of dough 31 and 30 against the peripheral flanges 33 and their associated partitioning peripheral walls 32 (Figure 4). The sector shaped areas of dough defined within the flanges 27 and 28 are not affected or compressed in any way, but retain the form which they assumed when the large sheet of dough 31 was placed in position; the flange 27 being forced downward under pressure is now below the plane of the upper layer of dough 31. In this manner the large pie is divided into a plurality of individual pies of uniform size, shape and appearance each of said pies being a modification from the pie portion of the former standard practice in that the sweetmeat is sealed within a shell of dough. Mechanically compressing the upper and lower layers of dough together in the operation of sub-dividing the large pie causes the upper and lower layers of dough 27 and 28 to be united to form a much improved joint or weld which will not separate or crack during or after baking, and the permanence of the joint so formed is an improved advantage in small pies of the type described which are apt to be frequently and roughly handled, so that any weakness in the joint would result in the separation of the upper and lower layers of the pie crust. The foot operated lever 24 is now released and the pan die 8 is removed from the bowl 7 and inserted in the oven and baked. After being baked the individual pies may be removed from the pan die 8 by merely turning the same upside down when the pies fall out of their own weight.

In order to insure that the pan die 8 will be positioned in the bowl 7 in the proper position so that the radial partition walls 32 will register with the corresponding raised portions of the upper die 9, suitable perforated markers 34—34 on the pan die 8 may be caused to register with suitable studs 35—35 on the bowl 7. Any other preferred registry indicating means may however be substituted therefor.

It should be observed that while the matrix 40 is shown with a handle 41 it may have a shaft or supporting member similar to shaft 17 carrying the die 9 of Figure 3.

An open sector shaped pie unit or tart may likewise be formed in the same way by merely omitting the top sheet of dough 31.

What is claimed is:

1. The method of making individual sector shaped pies having the cubical contents of the conventional sector shaped pie portion which consists in placing one large common sheet of dough on a pie plate sub-divided by means of a series of radial partitioning walls into a plurality of receptacles each walled receptacle conforming in size and shape to the size and shape of the conventional sector shaped pie portion said plate constituting one member of a die, lining the dough snugly against the surface of said plate including the walls of said receptacles, filling the lined receptacles with a selected sweetmeat, placing one large common sheet of dough on top of the sweetmeat filled receptacles to completely cover the pie plate, crimping and uniting said common sheets of dough along all of said radial partitioning walls and the peripheral wall of said pie plate simultaneously while simultaneously sub-dividing said sheets of dough without appreciable wastage along said radial partitioning walls to form a plurality of individual self contained sector shaped pies each completely enclosed in a shell like wall of dough, and baking the pies in said plate.

2. The method of making individual sector shaped tarts which consists in placing one large common sheet of dough in a multi-sector-shaped receptacle pie plate, uniformly lining the dough against the surface of said plate including the partition walls separating said receptacles, filling the lined receptacles with sweetmeat, and sub-dividing the large multiple tart so formed without appreciable wastage into a plurality of individual self contained tarts by separating said common sheet of dough along all of said partition walls simultaneously, while at the same time trimming and removing the surplus dough encircling the peripheral wall of the pie plate.

3. The method of making individual sector shaped pies having the cubical contents of the conventional sector shaped pie portion which consists in placing one large common sheet of dough on a pie plate sub-divided by means of a series of partitioning walls into a plurality of receptacles each walled receptacle conforming in size and shape to the size and shape of the conventional sector shaped pie portion, said plate constituting one member of a die, lining the dough snugly and uniformly against all parts of said plate simultaneously including the walls of said receptacles, filling the lined receptacles with sweetmeat, placing one large common sheet of dough on top of the sweetmeat filled receptacles to completely cover the pie plate, compressing and sealing said common sheets of dough horizontally along the partition walls while simultaneously separating said common sheets of dough without appreciable wastage along the medial sections of each seal to form a plurality of individual self-contained sealed pies.

4. The method of making individual sector shaped pies having the cubical contents of the conventional sector shaped pie portion which includes placing one large common sheet of dough on a pie plate sub-divided by means of a series of partitioning walls and their associated laterally extending interconnected flanges into a plurality of flange topped receptacles, each receptacle conforming in size and shape to the size and shape of the conventional sector shaped pie portion, pressing the dough into each of said receptacles simultaneously in the operation of snugly and uniformly lining the surface of the plate, filling the lined receptacles with sweetmeat, placing one large common sheet of dough on top of the sweetmeat filled receptacles to completely cover the pie plate, and simultaneously compressing and securing said common sheets of dough together along and throughout the length and width of the lateral extensions of said flanges.

5. The method of making individual sector shaped pies having the cubical contents of the conventional sector shaped pie portion which includes uniformly lining the face of a pie plate—sub-divided by means of a series of partition walls and their interconnecting flanges into a plurality of flange topped receptacles—with a foundation layer of dough to cause the dough to conform to the configuration of the plate, filling the lined receptacles with sweetmeat, placing one large common sheet of dough on top of the sweetmeat filled receptacles to completely cover the pie plate, and in evenly compressing the foundation and upper layers of dough horizontally along the interconnecting flanges of the partition walls while separating said layers vertically along the medial lines of the flanges of the partitioning walls to produce a plurality of sector shaped pies.

6. The method of making individual sector shaped pies having the cubical contents of the conventional sector shaped pie portion which includes uniformly lining the face of a pie plate—sub-divided by means of a series of partition walls and their interconnecting flanges into a plurality of flange topped receptacles, and surrounded by a peripheral flange—with a foundation layer of dough to cause the dough to conform to the configuration of the plate, filling the lined receptacles with sweetmeat, placing one large common sheet of dough on top of the sweetmeat filled receptacles to completely cover the pie plate, evenly compressing the foundation and upper layers of dough horizontally along the interconnecting and peripheral flanges of said plate while separating said layers vertically along the medial lines of the interconnecting flanges, and separating the waste dough surrounding the edges of the pie plate.

7. The method of making individual sector shaped pies having the cubical contents of the conventional sector shaped pie portion which includes uniformly lining the face of a pie plate—sub-divided by means of a series of partition walls and their interconnecting flanges into a plurality of flange topped receptacles, and surrounded by a peripheral flange—with a foundation layer of dough to cause the dough to conform to the configuration of the plate, filling the lined receptacles with sweetmeat, placing one large common sheet of dough on top of the sweetmeat filled receptacles to completely cover the pie plate, evenly compressing the foundation and upper layers of dough along the interconnecting and peripheral flanges, separating the waste dough, baking the pies in said pie plate, and removing the baked pies from the plate prior to distribution.

8. The method of making individual sector shaped pies having the cubical contents of the conventional sector shaped pie portion which includes uniformly lining the face of a pie plate—sub-divided by means of a series of partition walls and their interconnecting flanges into a plurality of flange topped receptacles, and surrounded by a peripheral flange—with a foundation layer of dough to cause the dough to conform to the configuration of the plate, filling the lined receptacles with sweetmeat, placing one large common sheet of dough on top of the sweetmeat filled receptacles to completely cover the pie plate, evenly compressing and securely uniting said common sheets of dough horizontally along the interconnecting and peripheral flanges without compressing the crown of the pie, while separating said layers vertically along the medial lines of the interconnecting flanges, separating the waste dough overhanging the edge of the peripheral flange, baking the pies in said pie plate, and removing the baked pies from the plate prior to distribution.

Signed at Brooklyn in the county of Kings and State of New York this 14th day of March, A. D. 1931.

THEODORE M. MEARS.